US010468705B2

(12) United States Patent
Nishiumi

(10) Patent No.: US 10,468,705 B2
(45) Date of Patent: Nov. 5, 2019

(54) FUEL CELL CASE

(71) Applicant: TOYOTA JIDOSHA KABUSHIKI KAISHA, Toyota-shi, Aichi-ken (JP)

(72) Inventor: Hiroaki Nishiumi, Toyota (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 526 days.

(21) Appl. No.: 14/932,542

(22) Filed: Nov. 4, 2015

(65) Prior Publication Data

US 2016/0141703 A1 May 19, 2016

(30) Foreign Application Priority Data

Nov. 14, 2014 (JP) ................................ 2014-232042

(51) Int. Cl.
*H01M 8/2475* (2016.01)
*H01M 8/248* (2016.01)

(52) U.S. Cl.
CPC ......... *H01M 8/2475* (2013.01); *H01M 8/248* (2013.01); *H01M 2250/20* (2013.01)

(58) Field of Classification Search
CPC . H01M 8/2475; H01M 8/248; H01M 2250/20
USPC ....................................................... 429/469
See application file for complete search history.

(56) References Cited

U.S. PATENT DOCUMENTS

| 8,134,343 B2 * | 3/2012 | Like | B60R 16/04 |
| | | | 320/166 |
| 8,228,225 B1 * | 7/2012 | Ledbetter | H02B 3/00 |
| | | | 200/50.24 |
| 2012/0164500 A1 * | 6/2012 | Loo | H01M 2/1072 |
| | | | 429/82 |
| 2012/0264032 A1 * | 10/2012 | Watanabe | H01M 8/242 |
| | | | 429/467 |
| 2014/0147769 A1 | 5/2014 | Takeyama | |
| 2014/0322626 A1 * | 10/2014 | Naito | H01M 8/2475 |
| | | | 429/467 |

FOREIGN PATENT DOCUMENTS

| JP | H08-171926 A | 7/1996 |
| JP | 2006-040752 | 2/2006 |
| JP | 2006-221854 | 8/2006 |
| JP | 2010-135114 | 6/2010 |
| JP | 2011-129333 A | 6/2011 |
| JP | 2013-012325 | 1/2013 |
| WO | WO 2004/008563 A2 | 1/2004 |

* cited by examiner

*Primary Examiner* — Basia A Ridley
*Assistant Examiner* — James E Erwin
(74) *Attorney, Agent, or Firm* — Finnegan, Henderson, Farabow, Garrett & Dunner, LLP

(57) ABSTRACT

A fuel cell case that is configured to place a fuel cell therein, the fuel cell case includes: a first member including a bottom surface of the fuel cell case; and a second member fixed to an outer circumferential portion of the first member using a fastener, wherein a gasket seals between the first member and the second member, and the first member includes a rib, wherein the rib is positioned on an inner circumferential side of a portion where the first member comes into contact, with the gasket and is protruded upward from a surface where the first member comes into contact with the gasket.

4 Claims, 8 Drawing Sheets

Fig.5
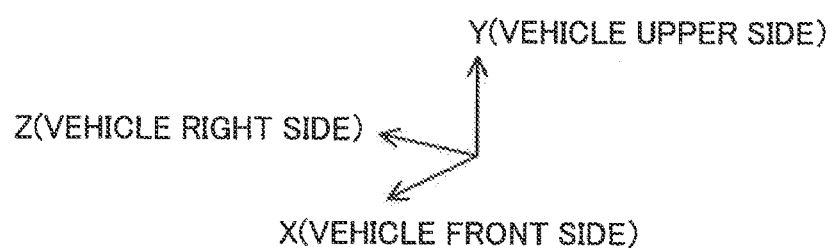
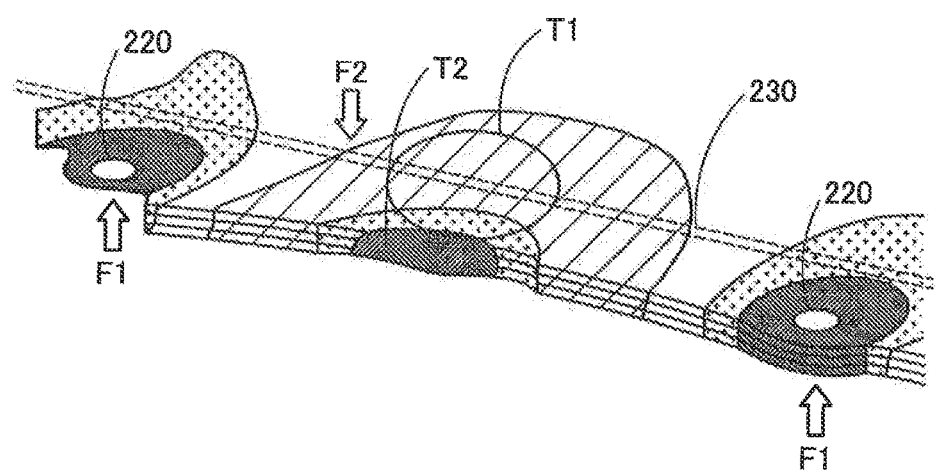

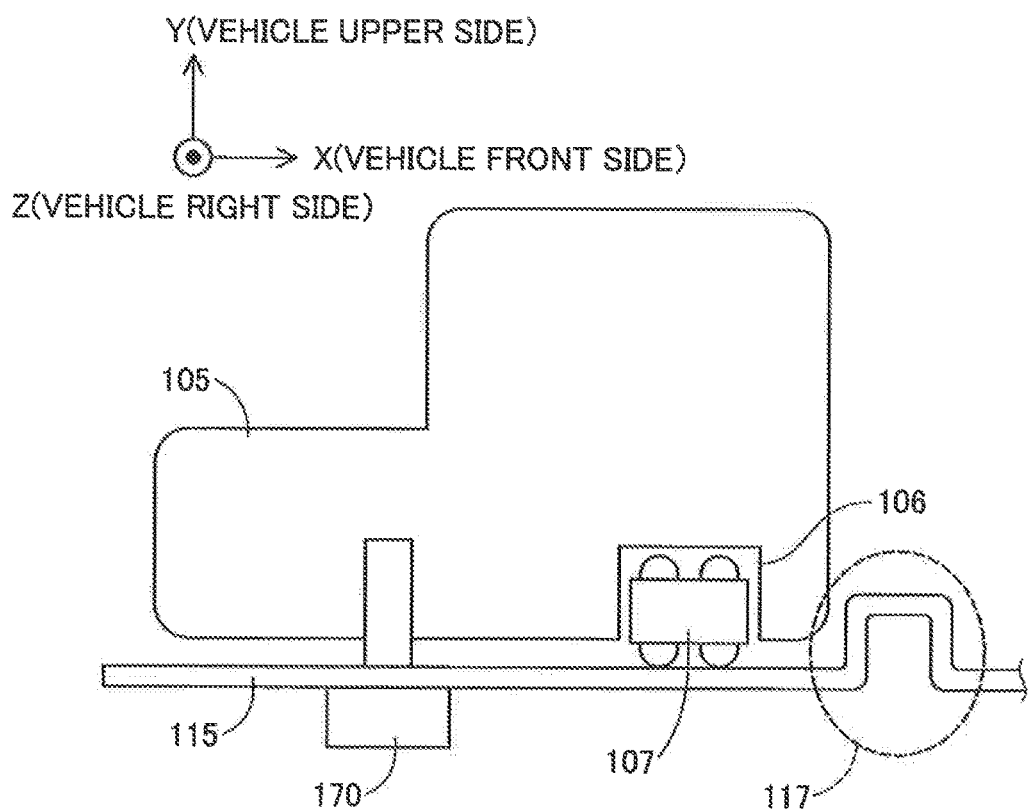

FUEL CELL CASE

CROSS-REFERENCE TO RELATED APPLICATION

The present application claims priority to Japanese Patent Application No. 2014-232042 filed on Nov. 14, 2014, the contents of which are incorporated herein by reference.

BACKGROUND

Field

The present invention relates to a fuel cell case.

Related Art

Conventionally, a fuel cell is accommodated in a fuel cell case to be protected from external force. The fuel cell case includes two members including an upper case and a lower case of a plate type. The upper case has an opening on one side and a flange around the opening. A gasket is disposed between the flange of the upper case and an outer circumferential portion of the lower case to prevent water and dirt from entering the fuel cell (for example, JP-A-2006-221854).

The fuel cell case has been requested to be downsized to be more freely installed at various locations. Using a thinner lower case is one way of downsizing the fuel cell case. However, such a thin lower case might be deformed by reaction of the gasket due to the difference between a position of the belt fixing the upper case on the lower case and a position of the lower case in contact with the gasket.

SUMMARY

The present invention is made to at least partially solve the problem described above, and can be implemented as the following aspects.

(1) One aspect of the present invention provides a fuel cell case that is configured to place a fuel cell therein. The fuel cell case includes: a first member including a bottom surface of the fuel cell case; and a second member fixed to an outer circumferential portion of the first member using a fastener, wherein a gasket seals between the first member and the second member, and the first member includes a rib, wherein the rib is positioned on an inner circumferential side of a portion where the first member comes into contact with the gasket and is protruded upward from a surface where the first member comes into contact with the gasket. According to this aspect, the rib increases the rigidity of the fuel cell case so as not to be deformed by the reaction from the gasket.

(2) In the fuel cell case according to the above-described aspect, the second member may include a groove portion in which the gasket is disposed. According to this aspect, an increase in the size of the fuel cell case in the upper and lower direction can be prevented compared with a configuration where the groove portion is provided in the first member.

(3) In the fuel cell case according to the above-described aspect, the fuel cell may be formed by stacking a plurality of fuel cells, and the second member may cooperate with a third member that supports one surface of the fuel cell in a stacking direction to compress the fuel cell in the stacking direction. Since the second member compresses the fuel cell, it is difficult to reduce the rigidity of the second member. According to this aspect, the rib increases the rigidity of the first member of the fuel cell case so as not to be deformed by the reaction from the gasket. Thus, the thickness of the first member can be reduced, so that the whole fuel cell case can be downsized with a smaller weight.

The present invention can be implemented in various aspects, examples of which include a method for manufacturing a fuel cell case, a computer program for implementing the manufacturing method, and a recording medium recording the computer program.

BRIEF DESCRIPTION OF DRAWINGS

FIG. 5 is a diagram schematically illustrating force applied to the conventional lower cover 215.

FIG. 7 is a cross-sectional view taken along the line A-A in FIG. 1.

DESCRIPTION OF EMBODIMENTS

A. Embodiment

Figure 1:
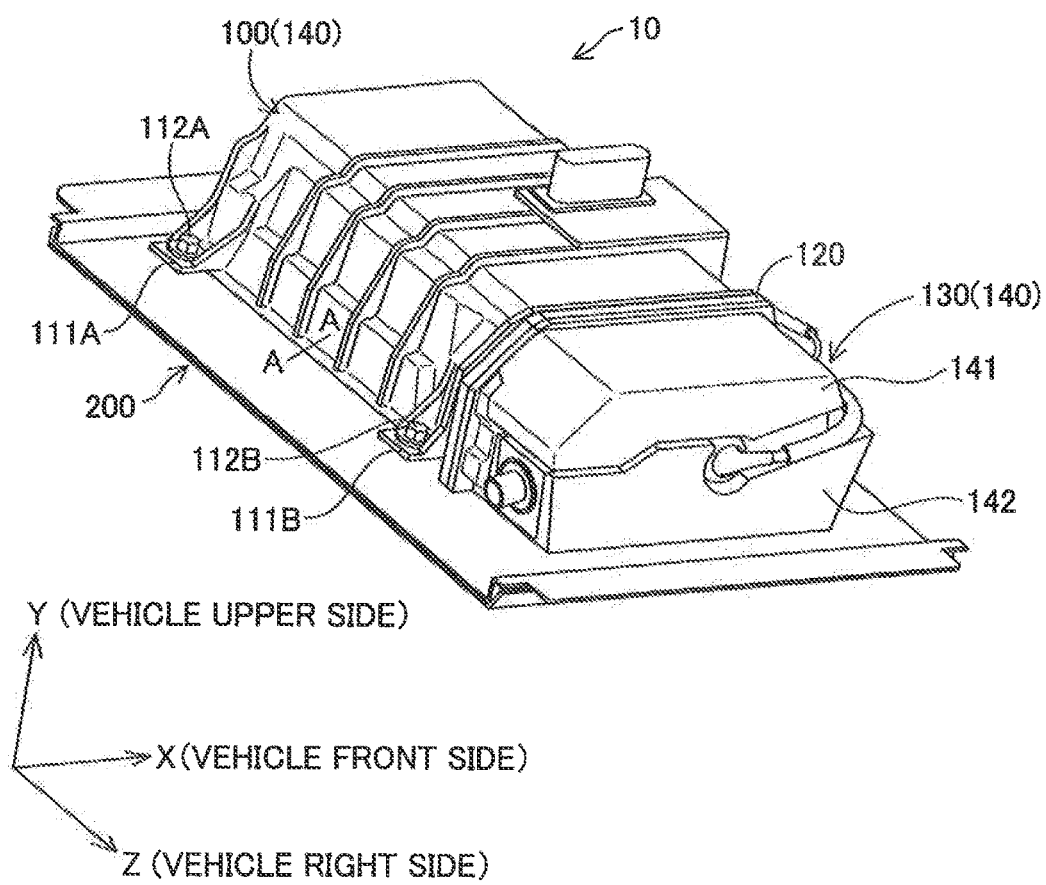
FIG. 1 is an outer view of a fuel cell system 10 used in one embodiment of the present invention.

FIG. 1 is an outer view of a fuel cell system 10 used in one embodiment of the present invention. The fuel cell system 10 includes a fuel cell system case 140 and a frame 200. The fuel cell system 10 is installed in a vehicle. In the present embodiment, the fuel cell system 10 is disposed below a vehicle interior. In FIG. 1 and other figures, a positive X axis direction, a positive Y axis direction, a positive Z axis direction, respectively represent front, upper, and right sides of the vehicle.

The fuel cell system case 140 includes a fuel cell case 100 and an auxiliary machine case 130. A gasket is provided to seal among the components of the fuel cell system case 140 so that foreign matters such as water and dusts are prevented from entering the fuel cell system case 140.

A fuel cell causes an electrochemical reaction between hydrogen gas as anode gas and oxygen gas as cathode gas. The fuel cell case 100 accommodates the fuel cell that is formed by stacking a plurality of fuel cells in a left and right direction (Z axis direction) of the vehicle.

The auxiliary machine case 130 accommodates a plurality of auxiliary machines (not illustrated) used for the fuel cell. The plurality of auxiliary machines include, for example, a hydrogen pump, an injector, an exhaust air and water discharge valve, a valve, a sensor, and the like. The auxiliary machine case 130 includes, in addition to the auxiliary machines, a cooling water pipe, wiring for supplying power to the auxiliary machines, and the like.

Surfaces of the auxiliary machine case 130 are covered with noise vibration (NV) covers 141 and 142 (see FIG. 1) to prevent vibration and noise produced by the auxiliary machines from being transmitted to the outside. In the present embodiment, each of the NV covers 141 and 142 has an outer layer formed of hard resin and an inner layer formed of urethane foam.

In the present embodiment, the plurality of auxiliary machines are fixed to a manifold 120. A side surface of the auxiliary machine case 130, on the left side of the vehicle (a side of the negative Z axis direction), is covered by the manifold 120. The manifold 120 forms a flow path for the hydrogen gas, the oxygen gas, and cooling water for cooling the fuel cell. The manifold 120 has a function of ensuring insulation from high voltage portions in the fuel cell case 100 and a function of compressing the cells in the fuel cell. The manifold 120 supports one surface of the fuel cell in the stacking direction.

The frame 200 is disposed below the fuel cell system case 140. The frame 200 supports the fuel cell system case 140 with bolts 112A and 112B inserted into bosses 111A and 111B formed on the fuel cell case 100 of the fuel cell system case 140. An anti-vibration rubber piece is disposed between the fuel cell system case 140 and the frame 200 to reduce vibration. The frame 200 is fastened to a main body of a vehicle (not illustrated).

Figure 2:
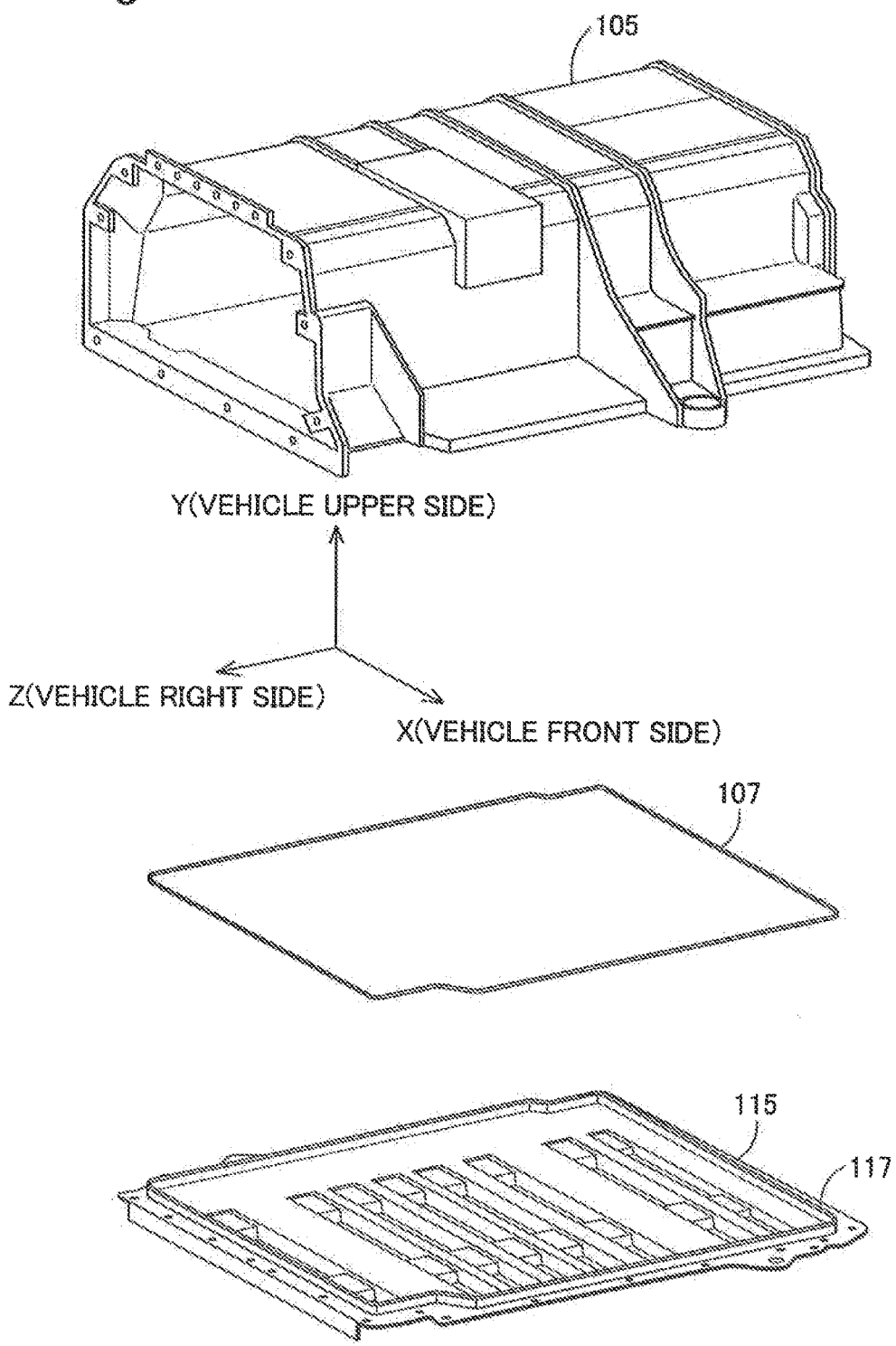
FIG. 2 is an exploded perspective view of a fuel cell case 100.

FIG. 2 is an exploded perspective view of the fuel cell case 100. The fuel cell case 100 includes a plurality a components. The fuel cell case 100 includes a stack case 105 and a lower cover 115. The stack case 105 covers side surfaces, except for a side surface on the right side (a side on the positive Z axis direction) of the vehicle, and an upper surface of the fuel cell. The lower cover 115 covers a bottom surface of the fuel cell. The lower cover 115 includes a bottom surface of the fuel cell case 100. The manifold 120 having a plate shape (see FIG. 1) covers the side surface of the fuel cell on the right side (the side on the positive Z axis direction) of the vehicle. The lower cover 115 corresponds to a "first member". The stack case 105 is fixed to an outer circumferential portion of the lower cover 115 with a fastener, and corresponds to a "second member". The "outer circumferential portion" is a portion surrounding the fuel cell. In the present embodiment, a bolt 170 (described later) is used as the fastener.

The fuel cell is formed by stacking the cells in the fuel cell, and thus needs to be compressed. In the fuel cell system 10, the stack case 105 cooperates with the manifold 120 to compress the fuel cell in the stacking direction. The stack case 105, the manifold 120, and an unillustrated shaft hold the stacking load of the fuel cell. Thus, it is difficult to downsize the fuel cell case 100 with a lower rigidity of the stack case 105. The manifold 120 corresponds to a "third member".

The gasket 107 seals between the stack case 105 and the lower cover 115. The sealing is ensured by compressing the gasket 107 with predetermined force. The gasket 107 can prevent the foreign matters such as water and dust from entering the fuel cell case 100.

Figure 3:
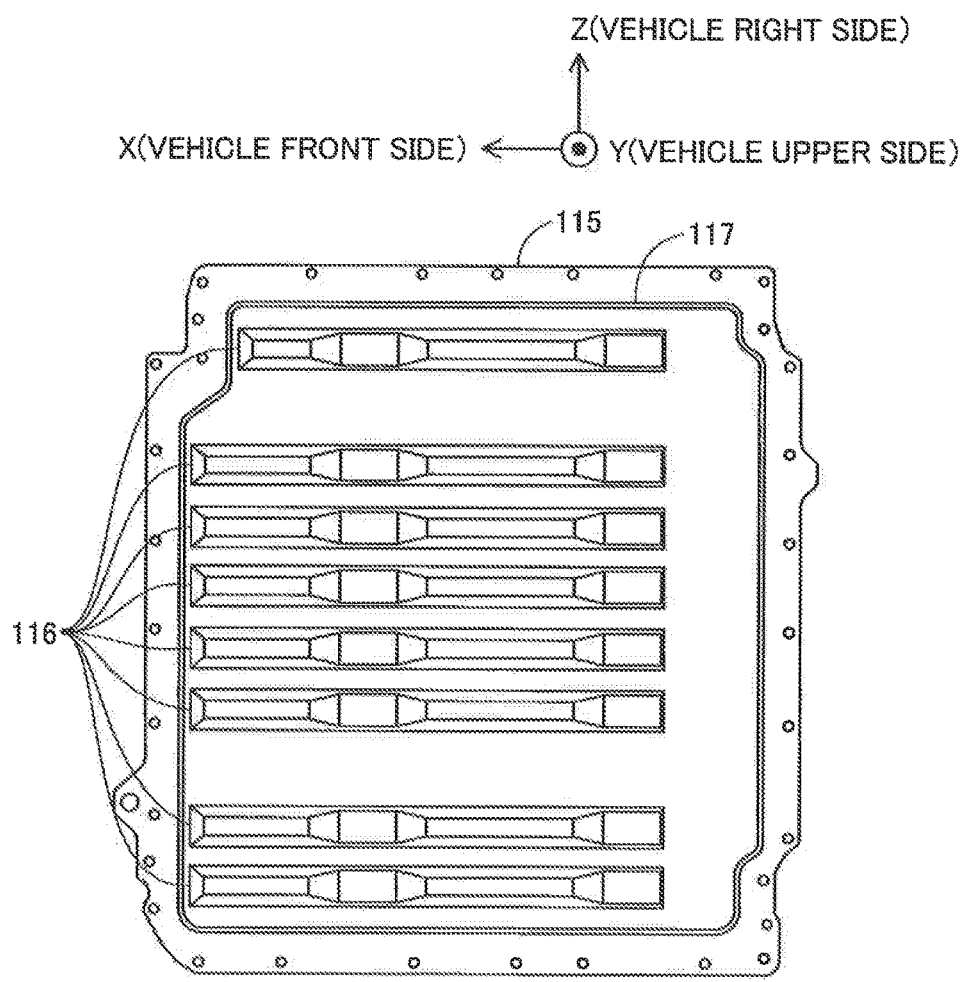
FIG. 3 is a diagram illustrating a lower cover 115.

FIG. 3 is a diagram illustrating the lower cover 115. As illustrated in FIGS. 2 and 3, the lower cover 115 includes a rib 117 protruding upward (in the positive Y axis direction). The rib 117 is positioned more on an inner circumference side than a portion where the lower cover 115 and the gasket come into contact with each other. Ribs 116 extending in the front and rear direction of the vehicle are provided.

Figure 4:
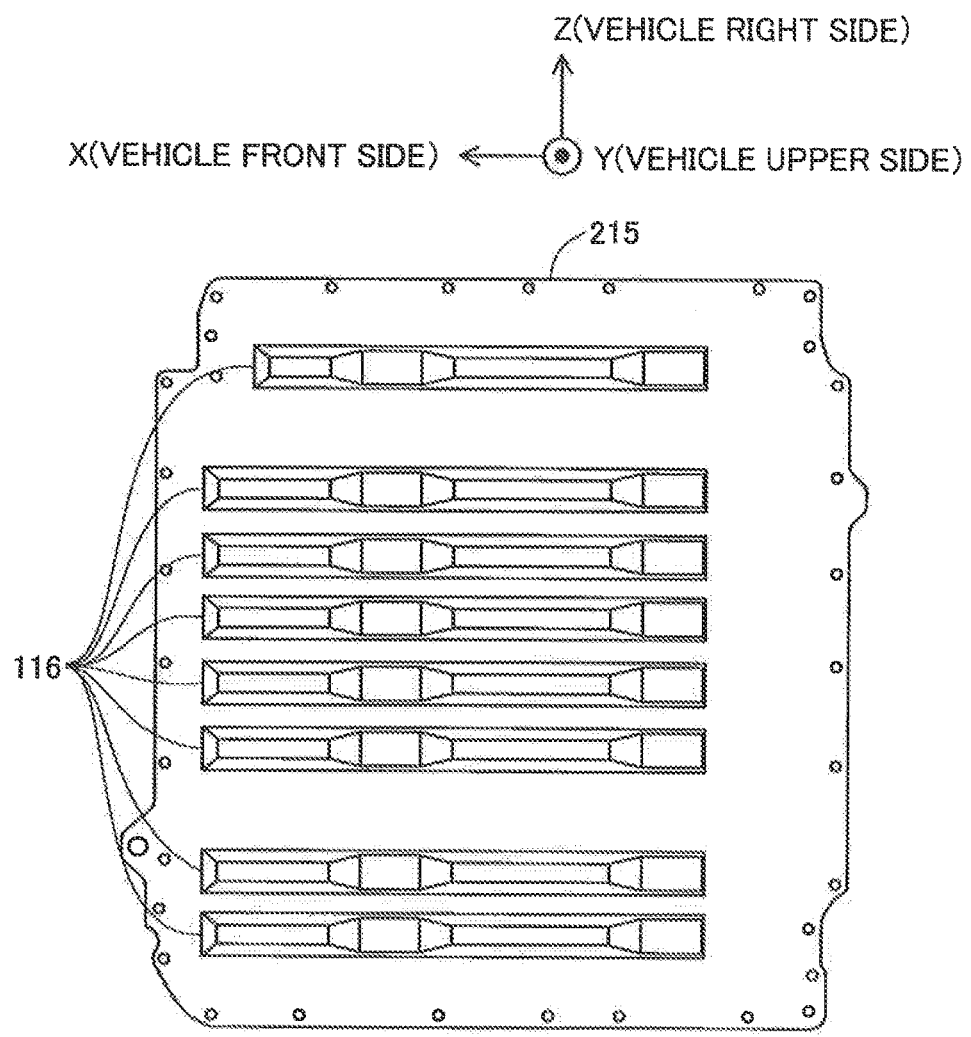
FIG. 4 is a diagram illustrating a conventional lower cover 215.

FIG. 4 is a diagram illustrating a conventional lower cover 215. The conventional lower cover 215 is the same as the lower cover 115 according to the present embodiment except that the rib 117 is not provided.

FIG. 5 is a drawing illustrating farce applied to the conventional lower cover 215. A bolt is inserted in each hole 220. A line 230 represents a portion to be in contact with the gasket 107 when the lower cover 215 is fixed to the stack case 105. In FIG. 5, a region where larger force is applied to the lower cover 215 is illustrated to be darker than a region where smaller force is applied to the lower cover 215.

The lower cover 215 receives force F1 in an upward direction of the vehicle (positive Y axis direction) from the bolts, and receives force F2 in a downward direction of the vehicle (negative Y axis direction) from the gasket 107. A position of the lower cover 215 where the force F1 is received is different from a position where the lower cover 215 receives the force F2, and thus the lower cover 215 with a small thickness can deform. As a result, the force compressing the gasket 107 applied from the lower cover 215 is small at a region T1 between the holes 220, and thus the sealing performance of the gasket 107 is degraded. As a result of the deformation of the lower cover 215 in the downward direction of the vehicle (the negative Y axis direction) in the region T1, the lower cover 215 comes into close contact with the stack case 105 in a region T2. Thus, as illustrated in FIG. 5, the lower cover 215 receives force at the region T2.

Figure 6:
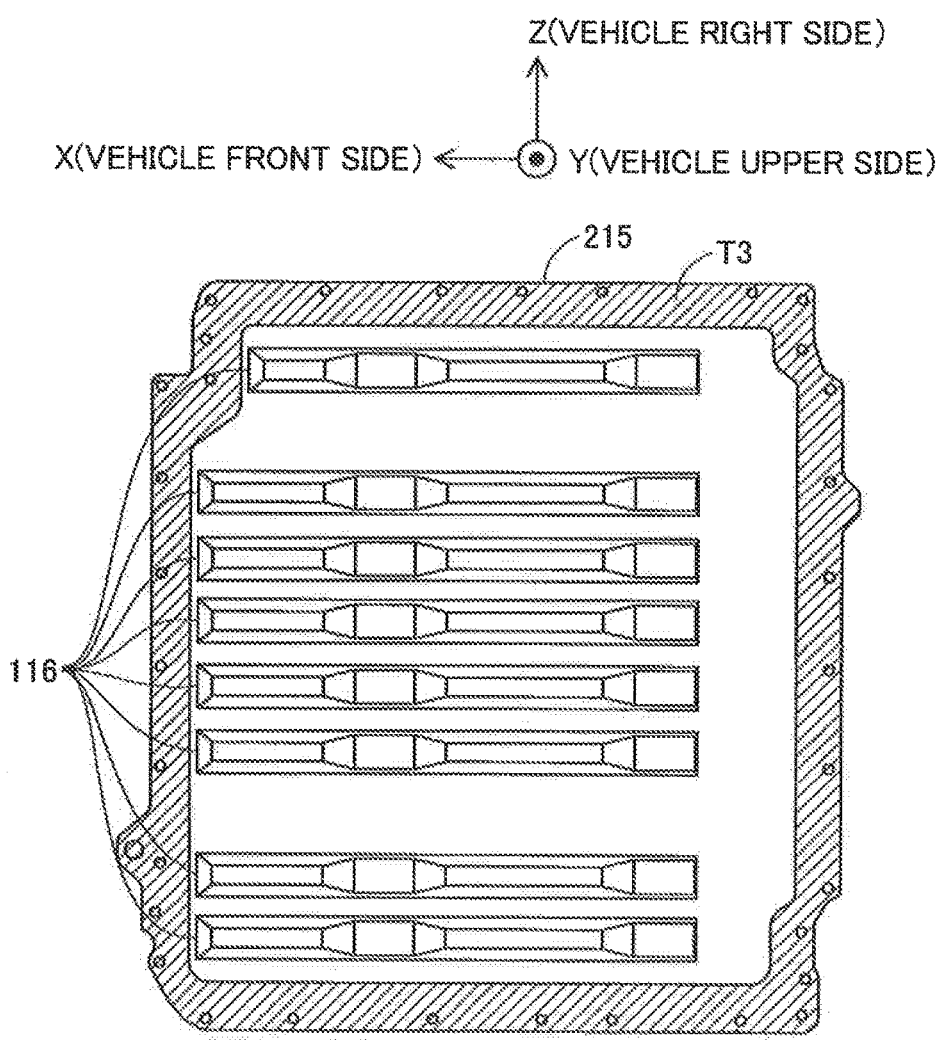
FIG. 6 is a diagram illustrating a method of solving the problem described above.

FIG. 6 is a diagram illustrating a method of solving the problem. As one method of preventing the lower cover 215 from deforming, the thickness of the lower cover 215 at a region T3 may be increased. However, to increase the thickness at the region T3, the thickness of the lower cover 215 as a whole needs to be increased, and this requires a higher cost and leads to a larger volume.

As another method of preventing the lower cover 215 from deforming, the number of bolts may be increased to achieve shorter distances among the bolts. However, this method requires an extra process of tightening the bolts, and thus leads to low productivity.

Thus, in the present embodiment, the problem is solved by providing the rib 117 (se FIG. 3) on the lower cover 115.

FIG. 7 is a cross-sectional view taken along the line A-A in FIG. 1. The gasket 107 seals between the lower cover 115 and the stack case 105. The stack case 105 is fixed to the outer circumferential portion of the lower cover 115 with the bolts 170. The rib 117 extending in the upper direction (positive Y axis direction) is arranged at a portion of the lower cover 115 more on the inner side than a portion to be in contact with the gasket 107.

The rib 117 is positioned more on the inner side than the portion of the lower cover 115 in contact with the gasket 107, and is provided over the entire circumference. Thus, the fuel cell case 100 has increased rigidity so as not to be deformed by the reaction from the gasket 107.

The rib 117 protrudes upward (in the positive Y axis direction) beyond a surface where the lower cover 115 and the gasket 107 come into contact with each other. Thus, an increase in the site of the fuel cell case 100 in the upper and lower direction can be prevented compared with a configuration where the rib 117 extends in the lower direction (negative Y axis direction).

When a groove portion in which the gasket 107 is disposed is provided on the lower cover 115, the size of the fuel cell case 100 increases in the upper and lower direction because the groove portion protrudes downward (in the negative Y axis direction). In the present embodiment, the stack case 105 includes the groove portion 106 in which the gasket 107 is disposed. Thus, an increase in the size of the fuel cell case 100 in the upper and lower direction can be prevented.

Figure 8A:
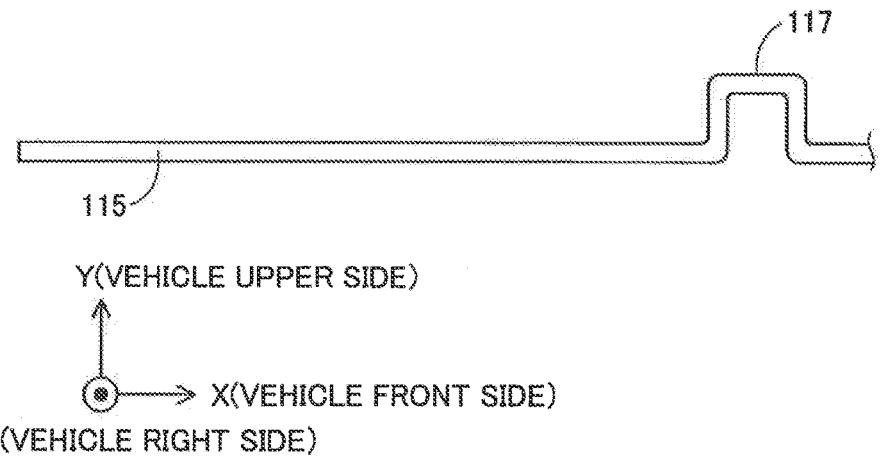
FIG. 8A is a diagram schematically illustrating how external force is absorbed by a rib 117.
Figure 8B:
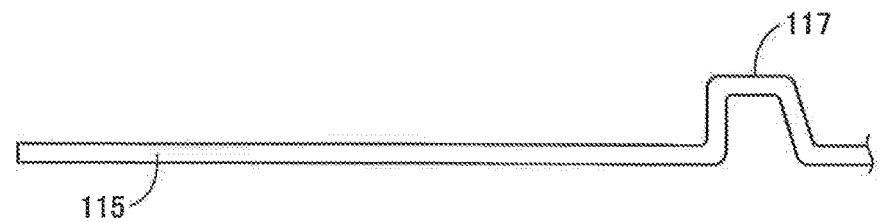
FIG. 8B is a diagram schematically illustrating how the external force is absorbed by the rib 117.
Figure 8C:
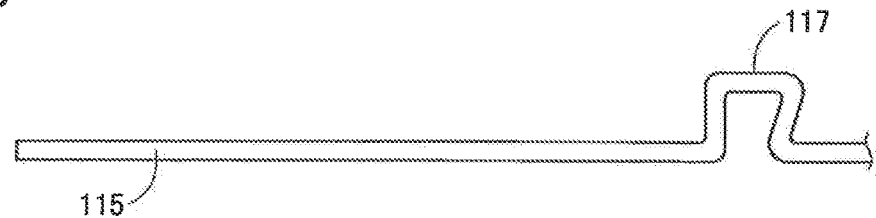
FIG. 8C is a diagram schematically illustrating how the external force is absorbed by the rib 117.

FIGS. 8A to 8C are diagram schematically illustrating how external force is absorbed by the rib 117. FIG. 8A is a diagram illustrating a state where no external force in the horizontal direction is applied to the rib 117. FIG. 8B is a diagram illustrating a state where external force in an expanding direction in the horizontal direction is applied to the rib 117. Here, the external force in the expanding direction can be absorbed by the rib 117 expanding in the horizontal direction. FIG. 8C is a diagram illustrating a state where external force in a compressing direction in the horizontal direction is applied to the rib 117. Here, the external force in the compressing direction can be absorbed by the rib 117 compressed in the horizontal direction.

B. Modification

B1. Modification 1

In the present embodiment, the lower cover 115 includes a groove portion in which the gasket 107 is disposed. However, the present invention is not limited to this, and the lower cover 115 may not include the groove portion in which the gasket 107 is disposed.

The present invention is not limited to the above-described embodiment and modifications, and can be implemented in various modes without departing from the spirit of the present invention. For example, the technical features of the embodiment and modifications corresponding to the technical features of each aspect described in the summary can be replaced or combined as appropriate so as to solve a part or the whole of the problem described above or achieve a part or the whole of the effects described above. Furthermore, technical features that are not described as being essential in the specification can be deleted as appropriate.

What is claimed is:

1. A fuel cell case that is configured to place a fuel cell therein, the fuel cell case comprising:
 a first member that is a plate-shaped member and that is configured to support a bottom surface of the fuel cell to be placed thereon; and
 a second member fixed to an outer circumferential portion of the first member using a fastener and covering a side surface of the fuel cell, wherein the second member has an opening on one side thereof and a flange around the opening,
 wherein a gasket seals between the first member and the second member,
 wherein the first member includes a rib that is devoid of contact with the gasket, the rib being positioned in a location that is on an inner circumferential side of a portion where the first member comes into contact with the gasket, where the rib is protruded upward from a surface where the first member comes into contact with the gasket, and
 wherein the second member includes a groove portion in which the gasket is disposed above the surface where the first member comes into contact with the gasket.

2. The fuel cell case in accordance with claim 1, wherein the fuel cell is formed by stacking a plurality of fuel cells, and
 the second member cooperates with a third member that supports one surface of the fuel cell in a stacking direction to compress the fuel cell in the stacking direction.

3. The fuel cell case in accordance with claim 1, wherein
 a first surface of the gasket comes into contact with a flat surface of the first member, and
 a second surface of the gasket that is opposite to the first surface of the gasket comes into contact with the second member on an inner side of the groove portion.

4. The fuel cell case in accordance with claim 1, wherein
 the rib has a shape that is formed by deforming the plate-shaped first member in a convex shape in a direction towards the second member.

\* \* \* \* \*